Figure 1:
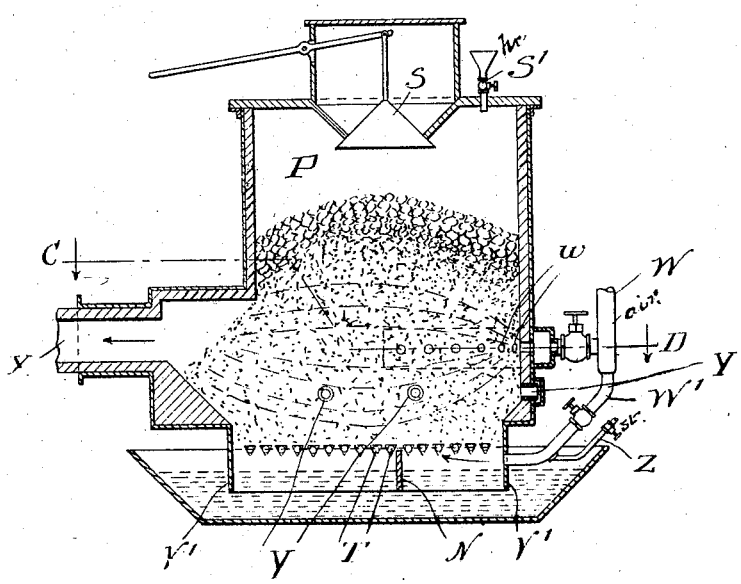

No. 840,461. PATENTED JAN. 8, 1907.
W. H. ADAMS & F. POWELL.
PROCESS OF MANUFACTURING PRODUCER GAS.
APPLICATION FILED JUNE 20, 1904.

Witnesses:
Wm. Geiger
A. W. Lindsay

Inventors:
William H. Adams
Frederick Powell
By Munday, Evarts & Adcock.
Attorneys

UNITED STATES PATENT OFFICE.

WILLIAM H. ADAMS AND FREDERICK POWELL, OF PORTLAND, OREGON, ASSIGNORS OF TWENTY-FIVE PER CENT. TO SAID ADAMS, FIFTEEN PER CENT. TO SAID POWELL, AND SIXTY PER CENT. TO THE LADD METALS COMPANY, A CORPORATION OF OREGON.

PROCESS OF MANUFACTURING PRODUCER-GAS.

No. 840,461.     Specification of Letters Patent.     Patented Jan. 8, 1907.

Application filed June 20, 1904. Serial No. 213,242.

*To all whom it may concern:*

Be it known that we, WILLIAM H. ADAMS and FREDERICK POWELL, citizens of the United States, residing in Portland, in the county of Multnomah and State of Oregon, have invented a new and useful Improvement in Processes of Manufacturing Producer-Gas, of which the following is a specification.

Our invention relates to the new process for the continuous manufacture from any substance containing sufficient carbon for the purpose—such as peat, sawdust, wood, coal, or coke or from any of these substances mixed with petroleum, tars, asphaltum, &c., in proper proportions—of what is generally known as "producer-gas."

Producer-gas is now manufactured as follows: In one method the generator is supplied with fuel from the top, has a grate near the bottom to sustain the body of fuel, means for admitting air under the grate, and an exit-pipe at the top for the delivery of gas to the furnaces, wherein it is burned by the addition of heated air, or to the scrubbers and thence to gas-holders to be used for other purposes. In this class of generators the air passes upward through the body of fuel, and during the operation the contained heat, water-vapors, tars, &c., pass through the exit-pipe at the top of the generator and deposit a considerable amount of tar and free carbon or lampblack in their passage to the point of consumption or to the scrubber. In this generator also the combustion in the lower strata of the fuel reaches high heats, and in this zone many reactions take place by which the oxygen of the air, the carbon of the fuel, and the hydrogen of the water are brought into contact to produce gas. The fuel in the upper part of the generator is subjected to a gradually-increasing temperature, due to the combustion of the lower strata, so that distillation takes place in the upper part of the producer and continues at temperatures increasing as the fuel descends, whereby all the water, whether free or hygroscopic, nearly all the volatile hydrocarbons, the tars, and considerable unburned carbon in the form of lampblack pass out with the gas. When the gas is not to be immediately burned, it is necessary to pass it, with the distillation products, through scrubbers and purifiers, whereby the tar, lampblack, and other objectionable constituents are removed and also a considerable part of the volatile hydrocarbons. In this method of manufacture the gas produced varies materially in the percentage of its several constituents and also in the quantity and has only been successfully worked where the gas has been immediately burned, the loss taking place in scrubbers and washers being as much as thirty-five per cent. of the calorific power. In another form of generator the air-inlet is at the top and the outlet for the gas at the bottom; but this form is likewise objectionable. The volatile hydrocarbons and moisture of the fuel in this construction are drawn down through the zone of combustion just above the grate, and it is manifest that without a sufficient body of incandescent fuel at this place no possible dissociation of these constituents can take place; but such body of incandescent fuel cannot be maintained, because the downward draft carrying the water and volatile hydrocarbons reduces the temperature of the fire to a point too low to accomplish the reactions necessary for making fixed gas. The air drawn into the fuel is diluted with elements which do not support combustion, but which greedily absorb the oxygen from the air at the temperature of dissociation. Consequently combustion rapidly diminishes in producers of this type with a constant feed and downward draft. To carry on practicable and economical operations with this type of producers, a series of two or more of them are needed, so that the fires can be blown up during one interval and the gas made by reversing the draft during another interval, an intermittent operation requiring great care and watchfulness. Failure to reverse the draft at the proper instant results in the production of a large volume of undecomposed water-vapor, tar, and products of combustion diluted to the point of being valueless.

Our invention is intended to supply a less expensive self-contained and generally useful method of gas-production which will permit the working of any class of fuel containing sufficient carbon to make a hot fire, preferably the culm coals, peat, sawdust, and all classes of waste wood that are easy to burn, and which will be continuous and positive in its operations and capable of making gas of uniform composition.

We make use of a new form of generator in the practice of our process, the construction of which will be understood from the accompanying drawings, in which—

Figure 2:
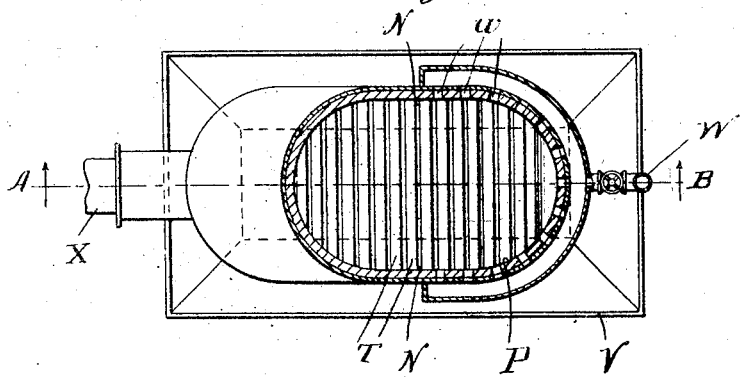

Figure 1 is a vertical section on the line A B of Fig. 2, and Fig. 2 is a horizontal section on the line C D of Fig. 1.

The chamber P of the generator is preferably elliptical in form and is elongated at the base just above the grate T, so as to form an increased area at the zone of incandescence. In this manner we insure an additional mass of fuel in this zone which we find desirable to thoroughly decompose and fix the products of combustion and the volatile constituents of the fuel. The fuel is admitted to the chamber of the generator by the feed device S, the operation of which will be understood.

S' represents a valved feeder through which liquid hydrocarbons may be admitted to the generator for enriching the gas.

A water-seal ash-pan is shown at V, and W is an air-inlet pipe having ports $w$, through which the air passes to the fuel.

X is the outlet for the gas, and, as will be seen, it is in the same horizontal plane practically as the air-inlet.

W' is an additional air-inlet for supplying air through that portion of the grate immediately below the ports W.

N is a vertical diaphragm placed transversely across the bottom of the generator below the grate and extending downward into the water in the ash-pan. This diaphragm limits the area of the grate through which air and steam are applied to the inlet W' and forms a close junction at its ends with the depending skirt V', which surrounds the grate-space and extends down into the water of the ash-pan. This skirt affects the water seal with the ash-pan and prevents the entrance of the air to the bottom of the grate, except such as is admitted by the air-inlet above described. The air and steam admitted through the portion of the grate described pass at first upward and then horizontally toward the gas-outlet X in the same manner as the air from the side inlets W.

Z represents a steam-inlet entering the air-pipe W' at a point close to the body of the generator, and Y represents poke-holes.

Our practice in making producer-gas with this type of generator is substantially as follows: The generator is first filled to a sufficient height above the grate with wood to act as kindling. On top of this is added sufficient fuel of any desired character to bring the level somewhat above the gas-outlet. The fire is then lighted through the poke-holes and increased by natural draft or the application of a gentle blast through the pipe W. All openings in the top of the generator are then closed substantially air-tight. The fire quickly spreads across the bottom of the generator, igniting the fuel up to the level of the top of the gas-outlet, as shown by the lines radiating from W. As soon as this is accomplished (ten or fifteen minutes being usually sufficient) the blast is increased and a regular feed of fuel is begun, care being taken to prevent the escape of gas at the top of the generator. The entire body of the fuel between the grate and the plane of the top of the gas-outlet is brought to a state of incandescence and afterward maintained in that state, so that a steady output of the gas can be obtained through the same and the quality of the gas be always within control of the operator by choice in the kind and in the quantity of fuel, the volume of air applied, and the amount of moisture in the fuel or applied in the form of steam at Z.

In this process the reactions take place as in other producers—namely, the union of the oxygen of the air with the carbon or hydrogen of the fuel producing carbonic acid and water-vapor, these being decomposed in their passage horizontally across the bottom of the generator through the bed of incandescent fuel and escaping through the gas-outlet X in the form of carbonic oxid and hydrogen with the usual percentage of nitrogen and a small amount of the other elements always found in producer-gas. In addition to this the volatile constituents of the fuel set free in the zone immediately above the zone of incandescence pass at once downward into the latter in their pure state undiluted with air, as in the case of the downdraft-producers referred to, and not driven forward in a crude state with the other gases, as in the updraft-producers, but, on the contrary, by their immediate entrance into the bed of incandescent fuel are at once converted into fixed gases; the moisture being converted into water-gas and the tars split up into permanent gaseous hydrocarbons and carbonic oxid.

The bed of fresh fuel above the zone of incandescence, which is a very important feature of our process, is renewed, of course, as fast as it settles into the zone of incandescence, and the form of the apparatus is such as to make it easy to maintain a constant renewal of the fuel and the withdrawal of the ash as fast as required, so as to maintain a uniform continuation of the process. It also enables us to maintain a zone of incandescence of uniform depth and extent; and by the exact regulation of the volume of air and the amount of fuel we are enabled to insure a constant high temperature, and therefore a constant percentage of gas from a known quantity of fuel. It is also practicable in our process to add to the bed of fresh fuel additional fuel rich in volatile hydrocarbons—such as crude petroleum, asphalt, &c.—which by their rapid volatilization enrich the gas to any desired extent. These may be added with the solid fuel or separately, as desired, through the feeder S' under proper control, or they may be supplied with an absorbent fuel, such as sawdust, and fed therewith. These volatile hydrocarbons become fixed gases in their passage through the zone of incandescence. Where the gas is lean in combustibles, we may in this manner enrich it to any desired extent during its manufacture, and this procedure is not feasible or practicable in other processes of manufacturing producer-gas.

The process can be carried on continuously or intermittently at will and can be practiced in a single producer, and we obtain with one generator all that is accomplished by the more expensive producer-plants heretofore used with their duplication of parts. The gas produced, which, of course, may vary somewhat in its constituents, is, however, substantially free from objectionable constituents—such as tars, volatile substances, and water-vapors—and can be at once utilized for heating boilers or for metallurgical work, or it can be cleansed in the usual manner at less expense and with no appreciable loss of valuable constituents.

We claim—

1. The improvement in the manufacture of producer-gas consisting in establishing a horizontal zone of incandescence in the lower portion of a long horizontal body of fuel, admitting air to one end only of the body and giving exit to the gas at the other end, the admission of the air and the exit of the gas taking place at the same level and in the plane of the zone and such exit being the only exit provided for the gas, whereby the rear portion of the incandescent fuel is caused to decompose the products of combustion from the front portion.

2. The process of manufacture of gas consisting in forming a long horizontal body of fuel, maintaining the lower portion of said body in an incandescent condition by the combustion of a portion of its constituents by means of air admitted at one end of the body and escaping at the opposite end, both inlet and outlet being below the top of the fuel and at the same level and such exit being the only exit provided for the gas, and the further decomposition of the products of combustion in their passage horizontally through the bed of incandescent fuel and the addition of steam, thereby producing so-called producer-gas with an additional percentage of hydrogen.

3. The process of manufacture of gas consisting in forming a long horizontal body of fuel, maintaining the lower portion of said body in an incandescent condition by the combustion of a portion of its constituents by means of air admitted at one end of the body and escaping at the opposite end, both inlet and outlet being below the top of the fuel and at the same level and such exit being the only exit provided for the gas, and the further decomposition of the products of combustion in their passage horizontally through the bed of incandescent fuel, the addition of steam, the generation thereby of so-called producer and water gas and the addition to the said producer and water gas of the volatile constituents contained in liquid fuel.

4. The process of manufacture of gas consisting in forming a long horizontal body of fuel, maintaining the lower portion of said body in an incandescent condition by the combustion of a portion of its constituents by means of air admitted at one end of the body and escaping at the opposite end, both inlet and outlet being below the top of the fuel and at the same level and such exit being the only exit provided for the gas, the addition to said bed of fuel of liquid fuels rich in volatile hydrocarbons, the further decomposition of the products of combustion in their passage horizontally through the bed of incandescent fuel, the addition of steam, the generation thereby of so-called producer and water gas and the addition to the said producer and water gas of the volatile constituents contained in liquid fuel.

WILLIAM H. ADAMS.
FREDERICK POWELL.

Witnesses:
ZERA SNOW,
SUSAN L. BRENNAN.